(12) United States Patent
Pascal

(10) Patent No.: US 6,697,419 B1
(45) Date of Patent: Feb. 24, 2004

(54) DIGITAL TRANSMISSION METHOD

(75) Inventor: Guterman Pascal, Roquevaire (FR)

(73) Assignee: Gemplus, Cedex (FR)

( * ) Notice: Subject to any disclaimer, the term of this patent is extended or adjusted under 35 U.S.C. 154(b) by 0 days.

(21) Appl. No.: 09/442,657

(22) Filed: Nov. 18, 1999

(30) Foreign Application Priority Data

Nov. 18, 1998 (FR) ............................................. 98 14492

(51) Int. Cl.[7] ............................. H04L 5/16; H04L 7/06
(52) U.S. Cl. ..................................... 375/219; 375/364
(58) Field of Search ......................... 370/279, 314–315, 370/508; 375/219

(56) References Cited

U.S. PATENT DOCUMENTS

| | | | | |
|---|---|---|---|---|
| 4,745,596 A | * | 5/1988 | Sato ........................... | 370/447 |
| 5,267,243 A | * | 11/1993 | Sarraf ........................ | 370/458 |
| 5,479,441 A | | 12/1995 | Tymes et al. | |
| 5,550,864 A | * | 8/1996 | Toy et al. ................... | 375/293 |
| 5,734,643 A | * | 3/1998 | Rondeau .................... | 370/279 |
| 5,787,132 A | * | 7/1998 | Kishigami et al. .......... | 375/354 |
| 5,848,072 A | * | 12/1998 | Prill et al. ................... | 370/471 |
| 5,883,901 A | * | 3/1999 | Chiu et al. .................. | 370/508 |
| 5,923,755 A | * | 7/1999 | Birch .......................... | 380/212 |
| 5,969,631 A | * | 10/1999 | Ammler et al. ......... | 340/825.21 |

FOREIGN PATENT DOCUMENTS

EP        0355607 A2        2/1990

* cited by examiner

*Primary Examiner*—Stephen Chin
*Assistant Examiner*—Lawrence Williams
(74) *Attorney, Agent, or Firm*—Burns, Doane, Swecker & Mathis, L.L.P.

(57) ABSTRACT

The invention relates to a digital transmission method, which can be used between two items of computer equipment. This digital transmission mode is characterized in that: the data are transmitted in the form of a series of digital signal frames (8), each frame (8) comprises at least successively, from start to end, frame synchronization signals (10), data signals (12) and control signals (14) for the transmitted data, and the characteristics of the synchronization signals (10) and of the data signals (12) and control signals (14) for the transmitted frames are specific to an item of reference computer equipment and are known to the follower computer equipment.

20 Claims, 1 Drawing Sheet

DIGITAL TRANSMISSION METHOD

This application is based on French Patent Application No. 98/14492, filed on Nov. 18, 1998, which is incorporated by reference herein.

BACKGROUND

1. Field of the Invention

The invention relates to digital transmission systems and methods and more particularly a digital transmission method or mode which can be used for transmitting data between two items of equipment, for example between an electronic chip card and a reading terminal.

2. Related Background

There are two modes of transmission or digital communication between items of equipment, for example of the data processing type, one known as "synchronous" and the other known as "asynchronous".

In the case of synchronous transmission, the elementary data are placed side by side and transmitted without interruption at the rate of a transmission clock signal. The start and end of a set of elementary data are marked by a characteristic succession of logic state transitions which takes place at the rate of the clock signal. There is therefore, for each elementary data item, neither a synchronisation signal nor a check signal.

In the case of asynchronous transmission, the data are transmitted individually and contain the information to be transmitted, synchronisation signals and check signals.

The synchronisation signals normally consist of a start bit of the transmission element and one or two end bits of the unitary transmission element. The check signals normally consist of redundant bits associated with the elementary data item.

The time separating two consecutive elementary data items is variable.

For the same frequency of transmission of the data bits, asynchronous transmission is slower than synchronous transmission because of the presence of synchronisation and check signals and any dead time between two consecutive elementary data items. However, synchronous communication requires the transmission of data clock signals, signals which are not always available on the communication channels of data processing equipment.

Moreover, in the case of the asynchronous transmission chip card, the check signals which are currently used, parity check for example, present a risk of not detecting certain transmission errors liable to occur in the case of chip cards since it is possible that two errors of the same nature may compensate for each other.

One aim of the present invention is therefore to propose a digital transmission method which does not present the drawbacks of the digital transmission methods of the prior art, notably those used by the transmission of data between an electronic chip card and a reading terminal with which the card may be in relationship, with or without contact.

SUMMARY

The invention relates to a method of transmitting data between an item of equipment referred to as "reference" equipment and an item of equipment referred to as "follower" equipment, such as a microcircuit card and a terminal for reading/writing to the said card, characterised in that it comprises the following steps consisting in:

a) grouping together, in transmitting equipment, the elementary data of a message to be transmitted in the form of a series of at least one elementary data item consisting of at least one series of elementary digital signals, b) transmitting the said series of elementary data to receiving computer equipment whilst causing it to be preceded by synchronisation signals which constitute, with the series of elementary data, a frame, the characteristics of duration and position of the elementary digital signals of each elementary data item and of the synchronisation signals being specific to the reference equipment.

The method defined above can be supplemented by a step (c) consisting of:

transmitting, to the receiving equipment, check signals for the transmitted data which consist of elementary digital signals.

The method is also designed to interrupt the transmission of the elementary digital signals for an interval of time separating two consecutive elementary data items, the said interval of time having a duration which is specific to the reference equipment.

This interval of time or window can be used for transmitting, during the said interval of time, at least one signalling signal indicating the end of transmission of a series of elementary data items, the said signal signalling the end of transmission of a series of elementary data items having characteristics of duration and position in the interval of time which are specific to the reference equipment.

The interval of time or window can be used to transmit, from the receiving equipment to the sending computer equipment, a signalling signal, referred as a data flow control signal, the said data flow control signal having characteristics of duration and position in the said interval of time which are specific to the reference equipment.

The number of elementary data items which are grouped together for transmission is variable from one frame to the next.

Each of the elementary digital signals of a data item has a duration which is specific to the reference equipment.

The elementary digital signals of a data item have relative positions with respect to each other which are specific to the reference equipment.

BRIEF DESCRIPTION OF THE FIGURES

Other characteristics and advantages of the present invention will emerge from a reading of the following description of a particular example embodiment of the invention, the said description being given with reference to the accompanying drawings, in which.

DETAILED DESCRIPTION

The invention will be described in its application to a microcircuit card, also referred to as an electronic chip card, which is able to communicate with a terminal, such as a banknote dispenser, by means of digital signals. transmitted by galvanic, radio, inductive or optical links. However, it applies to any communication or transmission of digital signals between two items of equipment.

In the remainder of the description, the microcircuit card will be referred to as the "reference equipment" whilst the terminal will be referred to as the "follower equipment" in order to indicate that the terminal communicates with the microcircuit card in accordance with a mode or method imposed by the latter, which constitutes the "reference".

It should be noted that the terminal and microcircuit card are in turn transmitting equipment and receiving equipment and share the same clock signals supplied by the terminal.

Figure 1:
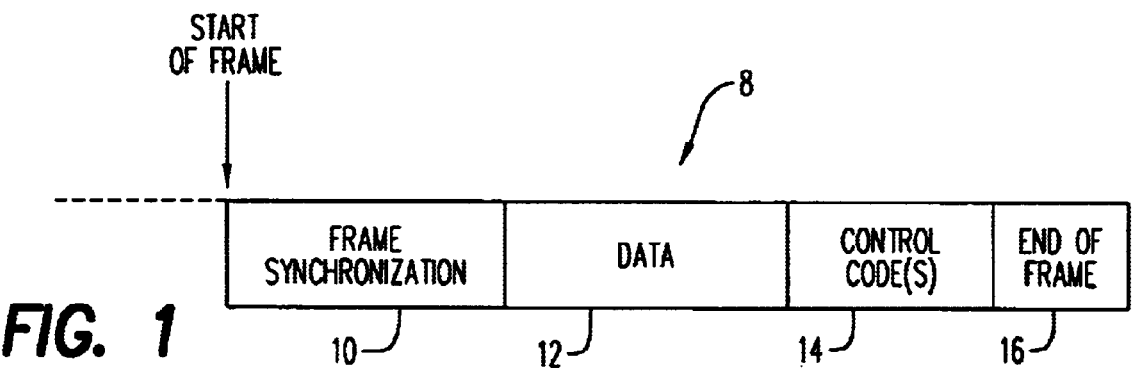
FIG. 1 is a diagram showing the composition or format of a digital transmission frame according to the invention.

The digital signal transmission method or mode according to the invention is characterised by a series of frames, each frame 8 having, for example, the composition or format shown in FIG. 1. Thus each frame successively comprises, from start to end, frame synchronisation signals 10, data signals 12, data control code signals 14 and an end of frame signal 16.

The data control code signals 14 can be similar to the data signals in their presentation.

Figure 2:
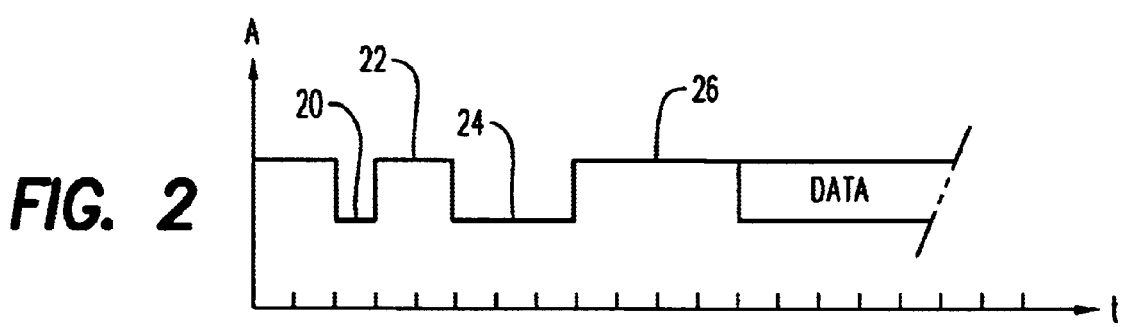
FIG. 2 is a diagram showing a particular shape of the frame synchronisation signals.

A particular form of the frame synchronisation signals 10 is depicted in FIG. 2. It comprises a series of rectangular signals 20, 22, 24 and 26 consisting of a succession of rising and falling edges. These edges are separated by intervals of time of given duration and equal to one clock cycle for 20, two clock cycles for 22, three clock cycles for 24 and a constant number for 26. The clock cycles are depicted on the time axis t whilst the amplitude A of the edges is depicted on the Y-axis.

This particular form of the synchronisation signals is a characteristic of the frame and of the electronic chip card in reception in order to enable it to synchronise itself with a view to analysing the data signals which follow.

Analysis of these synchronisation signals in a reception window corresponding to their total duration enables the receiver to determine its offset with respect to a time of origin and to deduce therefrom the duration separating it from the reception of the first data item.

Synchronisation can be achieved by other methods such as the transmission by the transmitter of a first synchronisation signal and in response from the receiver, after a variable duration, a signal indicating to the transmitter an agreed duration separating it from the reception of its first data item.

The advantage of the first method is to avoid the transmission by the receiver of a signal in return. Moreover, in the second method, certain items of transmission equipment cannot guarantee, with sufficient precision, the period at the end of which the first data item will be transmitted after reception of the return signal.

Figure 3:
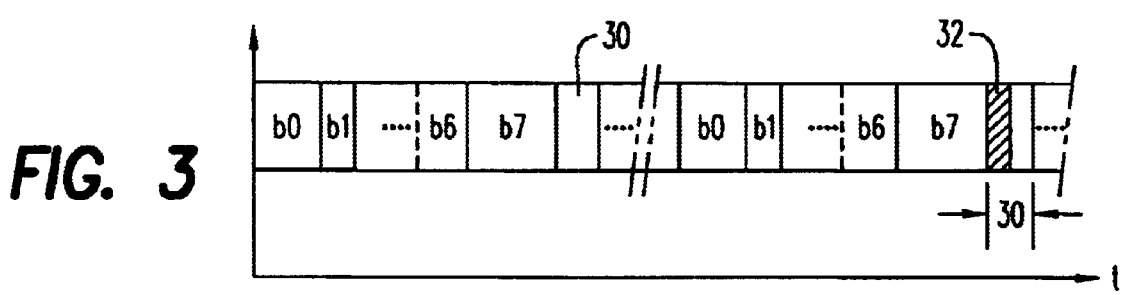
FIG. 3 is a diagram showing a composition of the data signals and data control codes as well as the end of frame signalling signal when such exists.

The data signals and the data control code signals are depicted in the diagram in FIG. 3 by way of particular example.

Figure 4:
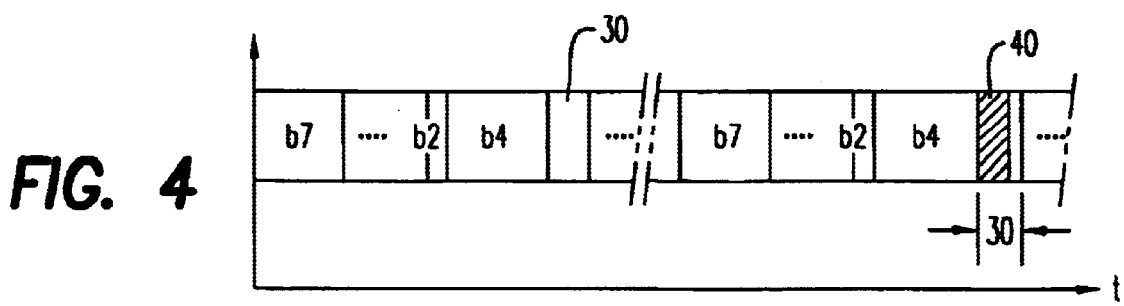
FIG. 4 is a diagram showing another composition of the data signals as well as the signal for signalling the data flow control by the receiving equipment.

The elementary data and the data control codes each comprise, for example, eight bits b0 to b7 forming a byte, and the bits of each byte can be stored in this order or in the order shown in FIG. 4 or any other order.

The duration allocated to the bits of the bytes can be different from one bit to another and constitute another characteristic of the frame and of the electronic chip card (reference equipment) in so far as these durations are the same from one byte to another for a given bit. The number N of bytes or data is variable from one frame to the next so that the frames are of variable duration.

In the duration intervals of the bits, the signal with the value "1" or "0" of the bit is present only for a given time and at a given position in this interval.

The number n of bytes of the data control signals is also variable according to the application and the type of check which is carried out.

Two consecutive elementary data items are separated by an interval of time or window 30 of given constant duration Ts, which is used for transmitting signalling signals such as an end of frame signal 32 (FIG. 3) or a reception suspension signal 40, referred to as data flow control (FIG. 4) known by the term Xoff. These two signals 32 and 40 have precise positions in this interval of time 30 so as not to be confused with each other.

In order to resume transmission, the receiving equipment transmits to the transmitting equipment a signalling signal known by the term Xon.

This signal Xon can consist, for example, of the frame synchronisation signal 10 or of an empty frame, that is to say one without any elementary data.

In one of the variants of the invention, the end of frame signal, situated in the interval 30, becomes a "non-end of frame" signal or a "frame continuation" signal, that is to say it slgnifies that a supplementary elementary data item is to be received.

The invention has been described by showing a transmission from the terminal to the microcircuit card, but it also applies to a transmission from the microcircuit card to a terminal, and the characteristics of the method used for each transmission can be different according to the direction of transmission.

In the example described, the microcircuit card constitutes the reference equipment for the transmission of data from the terminal to the microcircuit card but the roles could be the same or be reversed in the case of the transmission of data from the microcircuit card to the terminal.

What is claimed is:

1. A method of transmitting data between reference equipment and follower equipment, comprising:
    a) grouping together, in transmitting equipment, the elementary data of a message to be transmitted in the form of a series of at least one elementary data item consisting of a series of elementary digital signals, and
    b) transmitting said series of elementary data to receiving equipment together with synchronization signals which constitute, with the series of elementary data, a frame wherein the duration and position of the elementary digital signals of each elementary data item and of the synchronization signals are specific to each item of reference equipment.

2. A method according to claim 1, further comprising:
    (c) transmitting, to the receiving equipment, data control signals which consist of elementary digital signals.

3. A method according to claim 1 comprising:
    interrupting the transmission of the elementary digital signals for an interval of time separating two consecutive elementary data items, said interval of time having a duration which is specific to the reference equipment.

4. A method according to claim 3, further comprising:
    transmitting, during said interval of time, at least one signaling signal indicating the end of transmission of the series of elementary data items, wherein said signaling signal has a duration and position in the interval of time which are specific to the reference equipment.

5. A method according to claim 3, further comprising:
transmitting, during said interval of time, a signaling signal indicating that the transmission of the series of elementary data items will continue, wherein said signaling signal has a duration and position in the interval of time which are specific to the reference equipment.

6. A method according to claim 3, further comprising:
transmitting, during said interval of time, from the receiving equipment to the transmitting equipment, a data flow control signal, said data flow control signal having a duration and position in said interval of time which are specific to the reference equipment.

7. A method according to claim 1, wherein the number of elementary data items which are grouped together for transmission is variable from one frame to the next.

8. A method according to claim 1, wherein each of the elementary digital signals of a data item has a duration which is specific to the reference equipment.

9. A method according to claim 1, wherein the elementary digital signals of a data item have relative positions with respect to each other which are specific to the reference equipment.

10. A method according to claim 8, wherein the signal with the digital value "1" or "0" of the elementary digital signals of a data item has a position in the interval of time which is specific to the reference equipment.

11. A method according to claim 9, wherein the signal with the digital value "1" or "0" of the elementary digital signals of a data item has a position in the interval of time which is specific to the reference equipment.

12. A method according to claim 2, wherein the number of elementary data items which are grouped together for transmission is variable from one frame to the next.

13. A method according to claim 2, comprising:
interrupting the transmission of the elementary digital signals for an interval of time separating two consecutive elementary data items, said interval of time having a duration which is specific to the reference equipment.

14. A method according to claim 13, further comprising:
transmitting, during said interval of time, at least one signaling signal indicating the end of transmission of the series of elementary data items, wherein said signaling signal has a duration and position in the interval of time which are specific to the reference equipment.

15. A method according to claim 13, further comprising:
transmitting, during said interval of time, a signaling signal indicating that the transmission of the series of elementary data items will continue, wherein said signaling signal has a duration and position in the interval of time which are specific to the reference equipment.

16. A method according to claim 13, further comprising:
transmitting, during said interval of time, from the receiving equipment to the transmitting equipment, a data flow control signal, said data flow control signal having a duration and position in said interval of time which are specific to the reference equipment.

17. A method according to claim 13, wherein the number of elementary data items which are grouped together for transmission is variable from one frame to the next.

18. A method according to claim 13, wherein each of the elementary digital signals of a data item has a duration which is specific to the reference equipment.

19. A method according to claim 3, wherein the number of elementary data items which are grouped together for transmission is variable from one frame to the next.

20. A method according to claim 2, wherein each of the elementary digital signals of a data item has a duration which is specific to the reference equipment.

* * * * *